United States Patent [19]

Lorenz et al.

[11] Patent Number: 4,714,139
[45] Date of Patent: Dec. 22, 1987

[54] LUBRICATING SYSTEM FOR GAS TURBINE ENGINES AND PUMP FOR SUCH A SYSTEM

[75] Inventors: Joachim Lorenz, Riedenzhofen; Martin Gattinger, Eichenhofen, both of Fed. Rep. of Germany

[73] Assignee: MTU Motoren-und Turbinen Union Muenchen GmbH, Munich, Fed. Rep. of Germany

[21] Appl. No.: 911,293

[22] Filed: Sep. 24, 1986

[30] Foreign Application Priority Data

Oct. 2, 1985 [DE] Fed. Rep. of Germany ....... 3535107

[51] Int. Cl.$^4$ .............................................. F01M 9/06
[52] U.S. Cl. ................... 184/6.11; 184/6.24; 55/400
[58] Field of Search .............. 184/6.11, 6.21, 6.24, 184/11.1; 55/400

[56] References Cited

U.S. PATENT DOCUMENTS

| | | | |
|---|---|---|---|
| 2,204,814 | 6/1940 | Newell | 55/400 |
| 2,779,435 | 1/1957 | Hoeltje | 183/77 |
| 3,045,411 | 7/1962 | Dalrymple | 55/400 |
| 4,511,016 | 4/1985 | Doell | 184/6.11 |

FOREIGN PATENT DOCUMENTS

| | | |
|---|---|---|
| 3137947 | 10/1983 | Fed. Rep. of Germany. |
| 3242366 | 2/1985 | Fed. Rep. of Germany. |
| 1508212 | 4/1978 | United Kingdom. |
| 0322209 | 2/1972 | U.S.S.R. .............................. 55/400 |

Primary Examiner—Carlton R. Croyle
Assistant Examiner—Eugene L. Szczecina, Jr.
Attorney, Agent, or Firm—W. G. Fasse; D. H. Kane, Jr.

[57] ABSTRACT

A lubricating system for bearing shafts and the like, for example, in a gas turbine power plant especially for an aircraft, has an oil-air separator which is vented to the atmosphere. A pump wheel is used for the separation of the oil and the air out of an oil-air mixture. The pump wheel is so constructed that centripedal and centrifugal forces are employed for the oil-air separation. The air passes by centripedal force through a sponge type filter structure and out through a hollow central shaft carrying the pump wheel or forming an integral one-piece component with said pump wheel. The oil does not travel through the filter but is reversed in its travel direction by centrifugal force for return into the lubricant circulating system.

12 Claims, 7 Drawing Figures

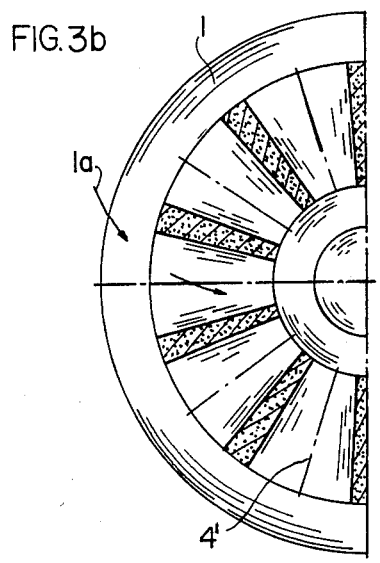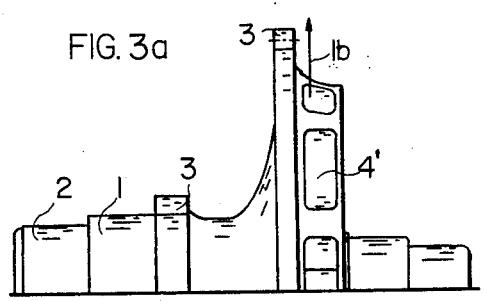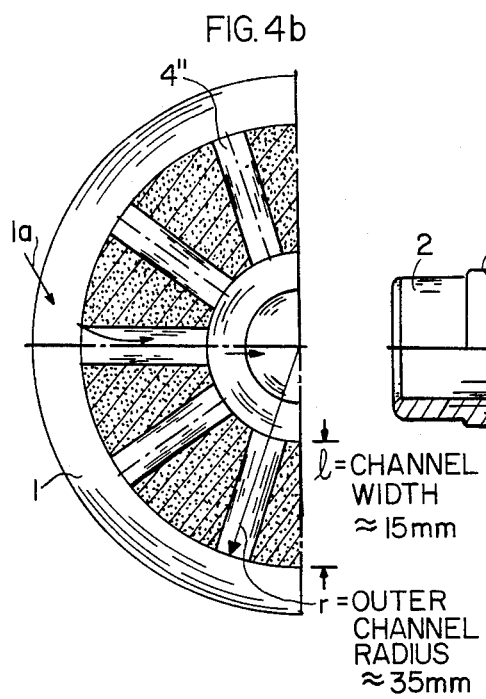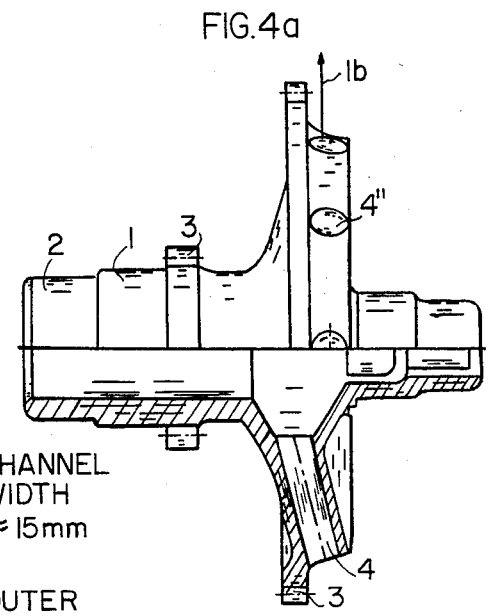

LUBRICATING SYSTEM FOR GAS TURBINE ENGINES AND PUMP FOR SUCH A SYSTEM

FIELD OF THE INVENTION

The invention relates to a system for lubricating points in a gas turbine engine, especially a gas turbine jet engine for aircraft. The points to be lubricated are bearings, shafts, or the like.

DESCRIPTION OF THE PRIOR ART

U.S. Pat. No. 4,511,016 (Doell) corresponding to German Patent Publication (DE-OS) No. 3,242,366 describes a lubricating system for gas turbine engines, wherein the points to be lubricated are connected through conduits into a lubricating circuit. A lubricating fluid, such as oil or the like, is withdrawn from an oil tank by an oil pressure pump which supplies the lubricant to the point that needs lubrication and a return conduit returns the lubricant to the supply tank. An oil-air separator is installed in the return conduit for separating any air that might be included in the lubricant, from the lubricant. The separator is vented to the atmosphere and uses centrifugal forces for the separation and for returning the lubricant into the lubricant circulating system.

Referring further to U.S. Pat. No. 4,511,016 (Doell) the oil-air separator may comprise an impeller on the axis of the separator and connected in series so to speak with a filter to provide a centrifugal separator. However, such centrifugal separators generally require a high r.p.m. which may involve pressure drops and friction losses across the filter.

German Patent Publication (DE-OS) No. 3,137,947 discloses an oil-air separator using a so-called "Retimet" packing or oil retaining ring for separating air out of an air-oil mixture. A disadvantage of this type of arrangement is seen in that the entire oil-air mixture must pass through the packing or oil retaining ring resulting in a very high pressure drop which must be compensated, for example, by using additional pumps.

U.S. Pat. No. 2,779,435 (Hoeltje) discloses a so-called centrifugal breather for overboard air vent lines or engine breather pipes in aircraft gas turbine engines. The Hoeltje oil-air separator uses a small centrifugal impeller driven by the engine and so arranged that the vented air flows radially inwardly of the fan which acts as a so-called "oil slinger" which permits the air to flow through against the small pressure head of the fan. The oil on the other hand impinges on the blades and will be flung outwardly of the blades by centrifugal force. It has been found that this type of oil-air separator is not very efficient because the required slight pressure difference is critical.

British Patent Publication No. 1,508,212 (Smith) also discloses a separator employing centrifugal force for the separation of the gas from the liquid in a suspension, whereby the suspension is also driven through a packing employing the above mentioned "Retimet" material, whereby the mentioned pressure drop is unavoidable.

OBJECTS OF THE INVENTION

In view of the foregoing it is the aim of the invention to achieve the following objects singly or in combination:

to construct a lubricating system in which the separation of the oil out of the air-oil mixture is efficient even under small pressure differences, for example, relative to atmospheric pressure;

to provide a lubricating system which assures the proper lubrication under all operating conditions without any impairment of the efficiency of the system;

to minimize oil leakage and operate at low pressure losses at low r.p.m.s of the special impeller while obtaining a higher efficiency nevertheless; and to provide a new separator including an impeller wheel and filter cartridge for such a lubricating system.

SUMMARY OF THE INVENTION

The lubricating system according to the invention is characterized by an oil-air separator which comprises a pump wheel with approximately radially extending channels. The pump wheel is mounted on or forms an integral component with a hollow shaft. A porous, especially air permeable filter packing is located in a central zone of the hollow shaft in the pump wheel and, due to its porosity, has a large surface area relative to the volume of the filter packing. The filter packing is surrounded by a screen drum or a screen type housing with openings leading to said channels, preferably through a ring space or chamber. The openings in the screen are large compared to the size of the pores in the filter packing.

By using a pump wheel which employs centripedal, as well as centrifugal forces for the oil-air separation, the invention assures that there is very little oil leakage and that the pump wheel may have small dimensions. This type of wheel is very efficient with radially extending channels which in turn has the advantage of an operation with reduced r.p.m.s and correspondingly reduced frictional losses.

The particular mounting of the filter packing according to the invention facilitates the air-oil separation and makes sure that any oil remainder out of the oil circulating circuit is separated already at the screen drum or housing or at least at the outer surface of the filter packing which is a location facilitating the throwing back of the oil from the outer surface of the filter packing while the practically oil-free air is removed centrally through the hollow shaft, to be discharged, for example, overboard.

Another advantage resulting from the structure of the screen drum and the particular mounting of the filter packing inside the screen drum is seen in that the oil separation accomplished by this structure causes very small pressure losses while a safe operation is assured at very low r.p.m.s even below 10,000 r.p.m. The present oil separator is even effective in an environment in which there is a very small excess pressure, that is, an excess pressure approaching zero in the space in which the oil-air separator must work, or rather in which the separator must draw in the oil-air mixture.

BRIEF DESCRIPTION OF THE DRAWINGS

In order that the invention may be clearly understood, it will now be described, by way of example, with reference to the accompanying drawings, wherein:

FIG. 3a is a plan view of the upper portion of a modified pump wheel to illustrate a particular shape of the radial channels;

FIG. 3b is an axial, partially sectional view of FIG. 3a for illustrating the shape of the radial channels;

FIG. 4a is a view similar to that of FIG. 3a, but showing radial channels with a differently shaped exit end;

FIG. 4b is a view similar to that of FIG. 3b, for illustrating the shape of the radial channels.

DETAILED DESCRIPTION OF PREFERRED EXAMPLE EMBODIMENTS AND OF THE BEST MODE OF THE INVENTION

Figure 1:
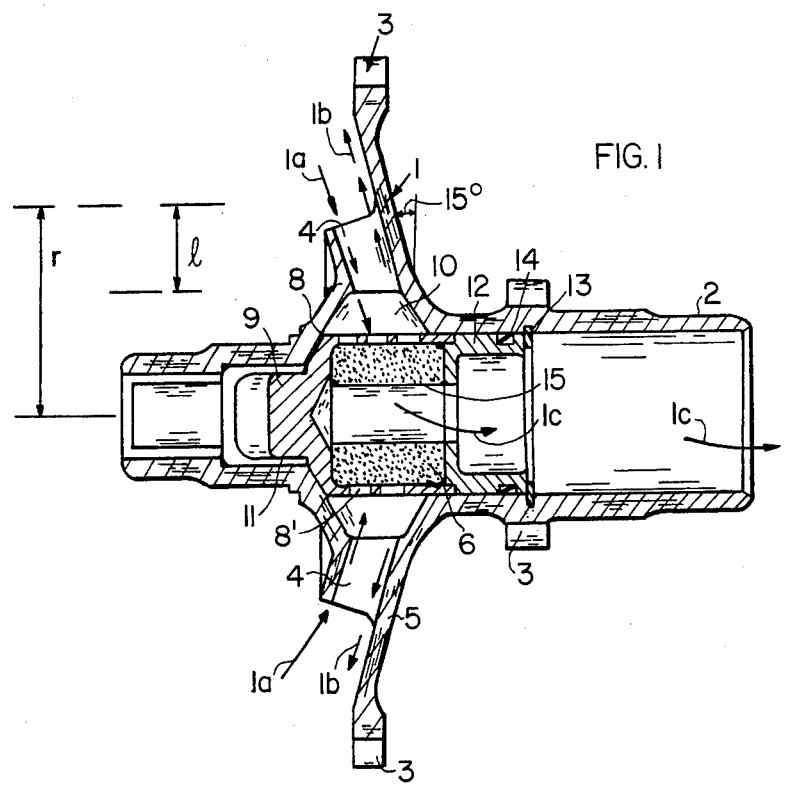
FIG. 1 is a longitudinal section through a pump wheel having a hollow shaft and a porous filter packing for use in a lubricating system which as such is known, and for example shown in FIG. 5.
Figure 2:
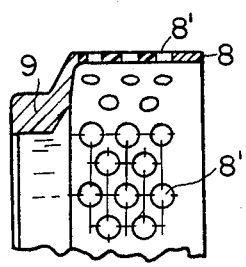
FIG. 2 is a partial sectional view through the screen drum or housing for mounting the porous filter packing in the pump wheel of FIG. 1.

FIG. 1 shows the pump wheel 1 with its hollow shaft 2 constructed as a single piece, integral element, for example, by casting or injection molding. One or, for example, two rings 3 of gear teeth are provided for co-rotating the pump wheel 1 with its shaft 2. The pump wheel 1 is provided with approximately radially extending channels 4 and a disk 5 through which the channels 4 extend. Arrows 1a indicate the flow of an air-oil mixture into the present separator wheel or pump wheel 1 by centripedal force. Arrows 1b indicate the removal of the separated oil by centrifugal force along the channel facing surface of the pump wheel disk 5. Arrows 1c indicate the removal of separated air through the hollow shaft 2.

The oil-air mixture enters into a ring chamber 10 along the path indicated by the arrows 1a. The ring chamber 10 surrounds a screen drum or housing 9 having a perforated wall 8 with holes 8' in the wall 8. A filter packing 6 is located inside the screen drum 9. The filter packing 6 has large pores so that its total surface area is large relative to its volume. A sponge type material is suitable for forming the filter packing 6. The holes 8' in the wall 8 of the screen drum 9 have cross-sectional areas which are large relative to the cross-sectional areas of the pores in the filter packing 6. The hollow shaft 2 forms an inner chamber 11 in which the screen drum 9 is received and held in place by a mounting ring 12 sealed against the inner wall of the hollow shaft 2 by an O-ring 14 and held in place by a spring ring 13. Thus, the screen drum 9 with its filter packing 6 forming a cartridge, is easily replaceable.

The oil-air mixture impinges through the holes 8' onto the porous filter packing 6, whereby the air passes through the filter packing 6 as indicated by the arrows 1c while the oil is reversed in its flow direction as indicated by the arrows 1b under the influence of the centrifugal force. It has been found, that the described structure enables the full utilization of the porosity of the filter packing 6 since the air can pass through the sponge type material of the packing 6 substantially unimpeded for further travelling out of the hollow shaft 2 for discharge overboard, for example. To facilitate the air removal further, the packing 6 has a ring shape to form a hollow cylinder 15 through which the air passes. The porosity of the foam or sponge type material of the packing 6 is so selected that the oil is practically prevented from passing through the pores while the holes 8' in the wall 8 of the screen drum 9 are relatively large to permit the oil to reverse its travel direction under the influence of the centrifugal force. It has been found that the free passage area formed by the holes 8' in the perforated wall 8 should correspond to about 25 to 50% of the entire surface area of the perforated wall 8. Preferably, the ratio of free passage surface area to solid wall area should be about ⅓. The oil collecting ring space 10 should have a larger volume than the filter packing 6, whereby the desired separation becomes especially efficient. It has further been found that an efficient oil separation without any pressure losses worth mentioning is achieved when the approximately or even substantially radially extending channels 4 have a radial length 1 relative to the outer radius r of the channel 4 satisfying the ratio of about $1:r \approx 1:2$. In other words, the outer radius r of the channels 4 is about twice as long as the radial length l of the channel 4 at its outer end.

Further, an efficient venting of the air along the arrows 1c due to improved flow conditions and flow transitions, is achieved in combination with a further reduction in the pressure drop across the filter packing 6 by making sure that the air passing surfaces of the hollow cylinder 15 inside the filter packing 6 corresponds to at least 20% of the cross-sectional area of the hollow shaft 2, more specifically of the bore in the hollow shaft 2.

FIGS. 3a and 3b show a modified cross-sectional shape for the channels 4' extending radially or approximately radially through the wheel 1. These channels 4' have a rectangular cross-section with rounded corners, whereby the cross-section increases radially outwardly. FIGS. 4a and 4b illustrate channels 4" having an approximately circular or elliptical cross-section which is constant along its length through the wheel in the radial direction. The rectangular, circular, or elliptical cross-sections may be referred to as "geometrical" cross-sections.

The above mentioned dimensions are examples only and have been found to be efficient. However, other dimensions may be employed, for example, when other output requirements must be met, whereby the respective ratios of the channel length to the channel radius and/or the cross-sectional ratios can be changed without undue experimentation in accordance with the particular requirement. The number of channels and the circumferential spacing between neighboring channels may also be modified in accordance with particular requirements such as the rated output and/or the r.p.m. and/or the intended pressure differential across the filter packing 6. Similarly, the cross-sectional shape may be further modified. For example, elliptical shapes may be desirable.

Figure 5:
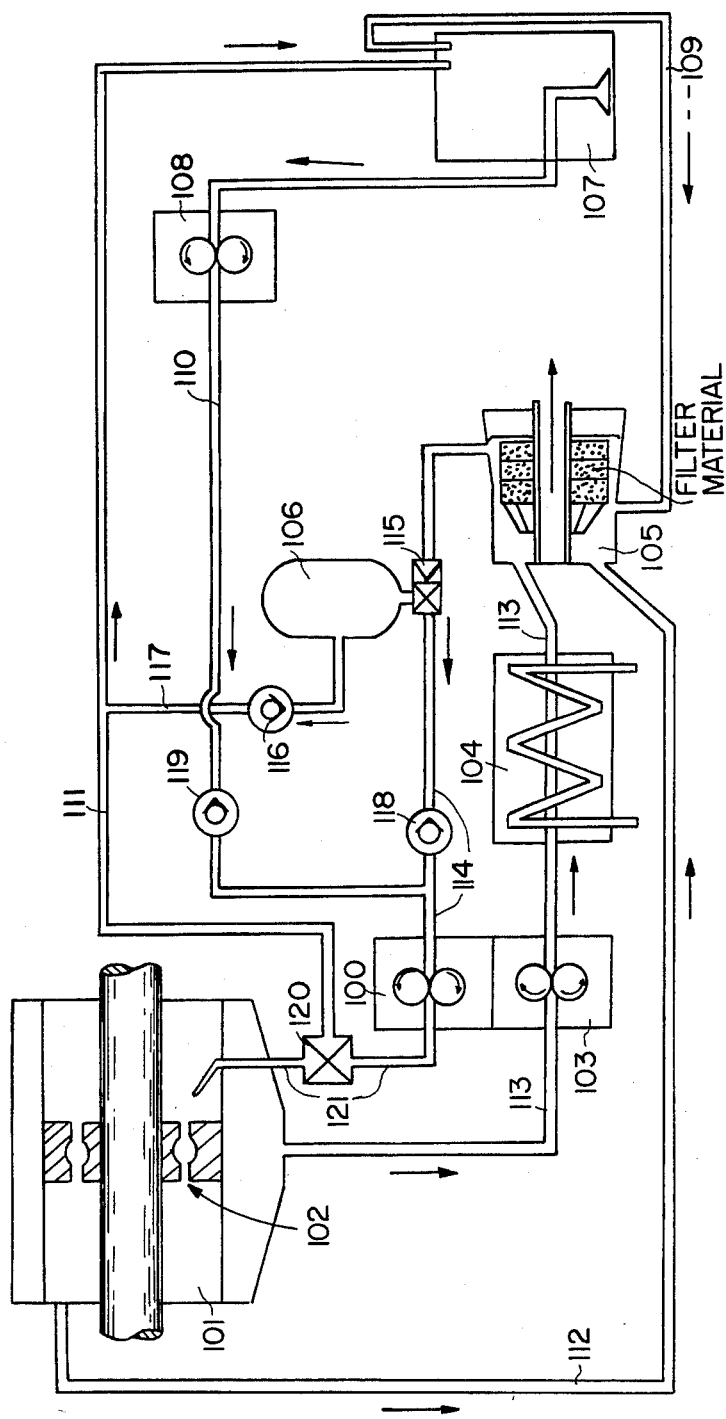
FIG. 5 illustrates a lubricating system as disclosed in U.S. Pat. No. 4,511,016 in which the present pump wheel could be used.

FIG. 5 illustrates a conventional lubricating system as disclosed in the above mentioned U.S. Pat. No. 4,511,016. The present pump wheel can be used with advantage in such a system. However, the present wheel can also be used in other lubricating systems.

Referring more specifically to FIG. 5 there is shown an oil pressure pump 100, a lubricating chamber 101 of, e.g., a shaft bearing 102 of a gas turbine jet engine, a return suction or scavenging pump 103, an oil cooler 104, an oil-air separator 105, and a separate accumulator or lubricant storage tank 106 to be used as needed. These components are operatively interconnected by hydraulic conduits as shown. The main function of the accumulator 106 is to dampen pressure peaks or irregularities that occur during critical flight phases as a result of oil displacement in the main lubricating circuit.

The second lubricant circulating circuit portion comprises essentially the common oil tank 107 and an additional, separate oil pressure pump 108 for feeding oil into the first circuit portion. The second circuit portion is vented through a vent 109 leading from the oil tank 107 into the oil-air separator 105 and connected to the first circuit portion through conduits 110 and 111.

The lubricating chamber 101 for the bearing 102 and thus also the first circuit portion are vented through the oil-air separator 105 connected through a conduit 112 to the chamber 101. In this manner the first circuit portion is properly vented under extreme flight conditions. This oil-air separator 105 comprises a centrically arranged vent pipe surrounded by a suitable storage mass for the return oil. A conduit 113 connects the lubricating chamber 101 to the oil-air separator 105. The scavenging pump 103 and the cooler 104 are connected in series in the conduit 113.

FIG. 5 further shows that an oil outlet of the oil-air separator 105 is connected through a return conduit 114 to a suction inlet of the oil pressure pump 100 of the first circuit portion. The accumulator 106 is operatively connected to the conduit 114 between the oil outlet of the oil-air separator 105 and the inlet of the oil pressure pump 100 of the first circuit portion through a control valve 115, which is simultaneously a check valve or non-return valve, for connecting or disconnecting the accumulator 106, whereby a constant, comparatively moderate flow is maintained even under said critical operating conditions independently of gravity influences. The accumulator 106 is vented to the oil tank 107 through a spill valve 116 in a spill line or conduit 117 connected to the tank return conduit 111. The valve 116 is a non-return valve. The lubricant supply conduit or line 110 of the oil pressure pump 108 for the second circuit portion is connected to the line or conduit 114 directly upstream of the oil pressure pump 100 for the first circuit portion. Check valves 118 and 119 are operatively arranged in line 114 and 110, respectively, upstream of the point where lines 114 and 110 are connected to the suction inlet of pump 100. These valves make sure that the flow direction in both circuits is as indicated by the arrow.

Additionally, a two-way valve 120 is arranged in the feed line 121 between the outlet of the pump 100 of the first circuit portion and the lubricant inlet of the chamber of the bearing 102, to spill excessive amounts of oil, if present, back into the tank 107 through the tank return line 111 as shown in the drawing. Under critical operating conditions the valve 120 closes the return line 111, thereby making the operation of the first circuit portion independent of the operation of the second circuit portion. Simultaneously, the valve 120 ensures the flow of oil to the bearing chamber 101 through a feed line 121, whereby the first circuit portion is a substantially closed circuit under such critical operating conditions.

Although the invention has been described with reference to specific example embodiments, it will be appreciated, that it is intended to cover all modifications and equivalents within the scope of the appended claims.

What we claim is:

1. A pump for separating a gas from a liquid, comprising pump housing means (106), a pump wheel, hollow shaft means for rotatably supporting said pump wheel in said pump housing means and for providing a gas discharge duct for venting separated gas, approximately radially extending flow channels in said pump wheel, porous filter means (6) located in a central zone of said hollow shaft for cooperation with said flow channels, said porous filter means having a large surface area relative to a volume of said porous filter means, screen drum means surrounding said filter means, said screen drum means having screen openings which are relatively large compared to pores in said porous filter means, said porous filter means being connected to said radial channels through said relatively large openings in said screen drum means, and wherein said pump wheel has a wall extending outwardly beyond the radial channels and forming a wheel disk having an outer circumference provided with drive means for driving said pump wheel.

2. The pump of claim 1, wherein said filter means and said screen drum means form a replaceable cartridge inside said hollow shaft.

3. The pump of claim 1, wherein said approximately radially extending channels have a geometrically shaped cross-sectional flow area.

4. A system for lubricating a point or component of a gas turbine engine, comprising lubricant supply conduit means and lubricant return conduit means for forming a substantially closed lubricant circulating circuit, lubricant pressure pump means in said lubricant supply conduit means for transporting lubricant to said point, lubricant-air separator means in said lubricant return conduit means for separating lubricant and air, said lubricant-air separator means comprising a pump wheel and a hollow shaft supporting said pump wheel, approximately radially extending flow channels in said pump wheel, porous filter means (6) located in a central zone of said hollow shaft for cooperation with said flow channels, said porous filter means having a large surface area relative to a volume of said porous filter means, screen drum means surrounding said filter means, said screen drum means having screen openings which are relatively large compared to pores in said porous filter means, said porous filter means being connected to said radial channels through said relatively large openings in said screen drum means, said approximately radially extending flow channels in said pump wheel having such a configuration and position that a lubricant air mixture is transported through said channels in a centripedal direction toward said filter means, whereby oil is returned directly from the surface of said filter means back into said closed lubricant circulating circuit due to centrifugal force caused by rotation of said pump wheel, and wherein said pump wheel has a wall extending outwardly beyond the radial channels and forming a wheel disk having an outer circumference provided with drive means for driving said pump wheel.

5. The lubricating system of claim 4, wherein said screen drum means is a portion of said hollow shaft.

6. The lubricating system of claim 4, wherein said filter means have a ring shape with a central free surface for an air exit, said central free surface forming a radially inwardly located cylinder for leading separated air into said hollow shaft.

7. The lubricating system of claim 4, wherein said filter means are made of a material having a sponge type characteristic which is air permeable and which forms a cartridge, and means for axially holding said cartridge in place in said hollow shaft.

8. The lubricating system of claim 4, wherein said screen drum means comprise a perforated wall (8) surrounding said porous filter means, said perforated wall (8) having free openings (8') therein with a cross-sectional flow area corresponding to about one third of a total surface area of said perforated wall (8).

9. The lubricating system of claim 4, further comprising a collecting ring chamber (10) formed in said pump wheel and surrounding said screen drum, said ring chamber (10) having a larger volume than said porous filter means.

10. The lubricating system of claim 4, wherein said approximately radially extending channels of said pump wheel have a radial channel length 1 which satisfies approximately the ratio of 1:2 or smaller relative to an outer radius r of said channels, thus $1:r \approx 1:2$.

11. The lubricating system of claim 4, wherein said approximately radially extending channels of said pump wheel are slanted relative to the radial direction, at an angle of up to about 15° toward the input side for the lubricant-air mixture.

12. The lubricating system of claim 4, wherein said filter means form a ring having an inner hollow cylinder (15) with an inner hollow cross-sectional flow area into said hollow shaft, corresponding to at least 20% of the cross-sectional area of the hollow shaft.

* * * * *